US008026288B2

(12) United States Patent
Takenouchi et al.

(10) Patent No.: US 8,026,288 B2
(45) Date of Patent: Sep. 27, 2011

(54) DEFOAMING METHOD (75) Inventors: Ken Takenouchi, Kanagawa (JP); Yoshiyuki Yuasa, Kanagawa (JP)

(73) Assignee: Toyo Seikan Kaisha, Ltd., Tokyo (JP)

( * ) Notice: Subject to any disclaimer, the term of this patent is extended or adjusted under 35 U.S.C. 154(b) by 525 days.

(21) Appl. No.: 12/162,075

(22) PCT Filed: Jan. 22, 2007

(86) PCT No.: PCT/JP2007/050904
§ 371 (c)(1),
(2), (4) Date: Jul. 24, 2008

(87) PCT Pub. No.: WO2007/086339
PCT Pub. Date: Aug. 2, 2007

(65) Prior Publication Data
US 2009/0020412 A1 Jan. 22, 2009

(30) Foreign Application Priority Data
Jan. 26, 2006 (JP) .................. 2006-017879

(51) Int. Cl.
*B01D 19/02* (2006.01)
*B01D 19/00* (2006.01)
*B65B 31/00* (2006.01)
*B67C 3/00* (2006.01)
*A23L 2/40* (2006.01)
*A23L 2/76* (2006.01)
*A23L 3/26* (2006.01)

(52) U.S. Cl. ........... 516/115; 141/5; 137/12.5; 426/232; 426/329; 426/330.3; 426/395; 426/397; 426/477

(58) Field of Classification Search .................. 516/116, 516/115; 141/4, 5; 137/12.5, 170.1, 170.3; 426/232, 329, 330.3, 395, 397, 477
See application file for complete search history.

(56) References Cited

U.S. PATENT DOCUMENTS
3,160,138 A 12/1964 Platzman
(Continued)

FOREIGN PATENT DOCUMENTS
JP 53-102178 8/1978
(Continued)

OTHER PUBLICATIONS
International Search Report of PCT/JP2007/050904, date of mailing Feb. 13, 2007.
(Continued)

*Primary Examiner* — Daniel S Metzmaier
(74) *Attorney, Agent, or Firm* — Westerman, Hattori, Daniels & Adrian, LLP (57) ABSTRACT

A defoaming method capable of destroying foams generated when a container is filled with drink, or the like, efficiently at a high speed and destroying foams effectively even in the case of a container having a narrow mouth. Liquid surface (6) in a container (1) is irradiated with pulse-like light (2) and a pulse-like sound wave (8) is generated from an irradiated point (7) as a sound source. The pulse-like sound wave thus generated propagates from the sound source as a strong spherical wave to reach a bubble (9) and to destroy the bubble. It can also destroy a bubble located at a place remote from the optical path quickly, thus destroying bubbles efficiently at a high speed. Alternatively, pulse-like light is condensed at a gas portion above the liquid surface and the bubbles can be destroyed with a shock wave generated by breakdown phenomenon.

5 Claims, 7 Drawing Sheets

U.S. PATENT DOCUMENTS

| | | |
|---|---|---|
| 6,599,948 B1 | 7/2003 | Hammond |
| 2007/0089606 A1 | 4/2007 | Cullen et al. |

FOREIGN PATENT DOCUMENTS

| | | |
|---|---|---|
| JP | 60-31306 U | 3/1985 |
| JP | 62-90397 U | 6/1987 |
| JP | 63-104620 A | 5/1988 |
| JP | 63-252509 A | 10/1988 |
| JP | 04-166553 A | 6/1992 |
| JP | 5-317606 A | 12/1993 |
| JP | 06-191595 A | 7/1994 |
| JP | 6-294777 A | 10/1994 |
| JP | 07-291395 A | 11/1995 |
| JP | 9-328193 A | 12/1997 |
| JP | 11-090330 A | 4/1999 |
| JP | 2002-523205 A | 7/2002 |
| JP | 2003-121423 A | 4/2003 |
| JP | 2003-185639 A | 7/2003 |
| WO | 98/15491 A2 | 4/1998 |
| WO | 2004/004571 A2 | 1/2004 |

OTHER PUBLICATIONS

European Search Report dated Feb. 18, 2009, issued in corresponding European Patent Application No. 07707167.8.

DEFOAMING METHOD

TECHNICAL FIELD

The present invention relates to a defoaming method, and more particularly to a defoaming method suitable for destroying foam generated when a container such as a can, a PET bottle, a bottle can, and a pouch is filled with a liquid such as a beverage.

BACKGROUND

In a filling process of producing packaged beverages (canned beverages, beverages in PET bottles, bottled beverages), the beverage is typically caused to flow from above into a container disposed vertically in a filling machine (filler) and then the container is joined to a lid member and sealed in a sealing machine (a seaming machine, a capper, and the like). In order to maintain the beverage quality and improve flavor, it is important that the amount of residual oxygen in the sealed container be reduced. The removal of oxygen from the headspace inside the container is especially important. A deoxidation technique such as undercover gas displacement performed immediately prior to sealing has been developed and used to realize such a removal. On the other hand, because packaged beverages are products consumed in large amounts, the rate of the filling process has been increased and, in the case of canned beverages, high-speed lines capable of producing 1000 to 2000 cans per minute have been put to practical use. Following the beverage filling process, foam is generated inside the container. Foam generation behavior and destruction behavior differ depending on the properties of individual beverages and filling conditions, but typically when the production rate is high, a large amount of foam is generated, the available time is insufficient for destroying the foam, and foam remains during sealing.

Foam contains oxygen at the same concentration level as the air, and because the oxygen contained in the foam cannot be removed by gas displacement in the headspace, the foam makes it difficult to decrease the amount of oxygen in the headspace. In particular, at present advanced level of deoxidation technology based on gas displacement, the remaining oxygen is mainly due to foam. Admixing a defoaming agent to a beverage preparation is presently generally employed to inhibit foam, but because the defoaming agent affects the beverage taste, a technology capable of defoaming after filling and before sealing is needed.

A method for defoaming by light irradiation has been considered as means for resolving this problem, and a large number of methods and devices relating to this technology have been suggested (see, for example, Patent Documents 1 to 4). Methods for laser beam irradiation have also been suggested. For example, a method for defoaming with laser radiation has been suggested by which intermolecular bonds forming a foam film and organic molecules or water molecules contained in the film are caused to oscillate and excited by irradiating foam with a laser beam, the intermolecular bonds are broken and foam is destroyed (see Patent Document 4).

Methods and devices for defoaming by irradiation with ultrasonic waves have also been suggested (see Patent Documents 5-9). Further, in addition to methods and devices using light and sound, those using heating, microwaves, high frequency, electric discharge, electric wind, electrostatic charges, and vapors have also been suggested.

Patent Document 1: Japanese Utility Model Application Laid-open No. 53-102178.

Patent Document 2: Japanese Utility Model Application Laid-open No. 60-31306.

Patent Document 3: Japanese Patent Application Laid-open No. 63-104620.

Patent Document 4: Japanese Patent Application Laid-open No. 63-252509.

Patent Document 5: Japanese Patent Application Laid-open No. 11-90330.

Patent Document 6: Japanese Patent Application Laid-open No. 7-291395.

Patent Document 7: Japanese Patent Application Laid-open No. 9-328193.

Patent Document 8: Japanese Utility Model Application Laid-open No. 62-90397.

Patent Document 9: Japanese Patent Application Laid-open No. 6-191595.

DISCLOSURE OF THE INVENTION

Problem to be Solved by the Invention

However, with the conventional defoaming methods using light irradiation, the defoaming rate is low and does not match the increased filling speed. As a result, such methods have not found practical use. These light irradiation techniques are based on the principle of irradiating foam with light energy, heating and evaporating the foam components (mostly water), thereby destroying the foam. Therefore, individual bubbles have to be directly irradiated with light energy, and because the bubbles are distributed over the entire liquid surface, the light energy has to be supplied substantially to the entire liquid surface to destroy the foam by light irradiation. The term "substantially" used herein means that either the light beam diameter is expanded to irradiate the entire surface at the same time, or that the irradiation is performed by scanning the liquid surface with a light beam of small diameter. In both cases, the total light energy represented by [(irradiation power per unit area)×(irradiation time)×(irradiation area)] is the same. Because time allocated for the defoaming process in the accelerated filling process is short, a sufficient defoaming effect cannot be obtained with a light intensity obtained with the usual light source. Conversely, a light source of a high power is needed to produce energy sufficient to attain the defoaming effect, and such light source is impractical.

On the other hand, when defoaming employs irradiation with ultrasound, for example, when defoaming is performed by irradiating with continuous ultrasonic waves generated by an external sound source, because the wavelength of ultrasound is of the same order as the size of the container that is the irradiation object, the waves lack directivity, the irradiation energy is dissipated, and the efficiency is poor. As a result, defoaming has to be performed over a long distance on a conveyor and the production line is extended. Accordingly, such an approach is undesirable from the standpoint of saving the space. Furthermore, in the case of narrow-mouth containers such as PET bottles or bottle cans, light, sound, etc. is difficult to transmit to the entire liquid surface through the mouth opening, and there is no effective defoaming means. Another problem associated with the conventional methods is that foam that has adhered, in particular, to the inner peripheral surface of the container practically cannot be destroyed.

Accordingly, it is an object of the present invention to provide a defoaming method that enables high-speed and efficient defoaming of foam generated when a container is filled with a beverage or the like, can be used for effective defoaming even in the case of narrow-mouth containers, and can be efficiently applied to high-speed lines and filling and sealing lines for narrow-mouth containers.

Means for Solving the Problems

The inventors have repeatedly tested defoaming methods by different testing methods and have discovered that pulsed sound waves have a broad spectral distribution and act effectively on foam. The results of subsequent research demonstrated that when a pulsed sound wave is generated from a point on the liquid surface inside a container, the sound wave propagates as a spherical surface wave due to large pressure variations from the generation source, gradually destroys foam present inside the container, expands, and can instantaneously and effectively destroy foam present on the liquid surface, including the foam present in the vicinity of the inner peripheral surface of the container. This finding led to the creation of the present invention. It has also been found that when the liquid surface is irradiated with pulsed light or when the pulsed light is condensed in a gas portion above the liquid surface with the object of generating the pulsed sound wave, an effective pulsed sound wave can be generated and even the foam located outside the optical path can be instantaneously destroyed, while performing light irradiation.

Thus, the defoaming method according to an aspect of the invention that resolves the above-described problems is characterized in that bubbles are destroyed by using a pulsed sound wave. According to another aspect of the invention the pulsed sound wave is generated by irradiation of pulsed light. According to another aspect of the invention the pulsed light is irradiated at condensed state. According to another aspect of the invention the pulsed sound wave is generated by condensing the pulsed light in a gas portion above a liquid surface.

According to another aspect of the invention the pulsed sound wave is generated by irradiating the pulsed light on a liquid surface. According to another aspect of the invention with respect to a container having a mouth that is narrower than a liquid surface where foam is generated, a diameter of a light beam of the pulsed light is made less than the mouth, and pass the light beam through the mouth. According to another aspect of the invention the pulsed light is irradiated through a wall surface of the container. According to another aspect of the invention the pulsed light is a pulsed laser beam.

According to another aspect of the invention is characterized in that in a line for filling a container with contents and sealing the container, foam generated inside a headspace of the container that is filled with the contents and is transferred to a sealing machine is destroyed by the defoaming method according to the above aspects of the inventions.

Effects of the Invention

According to these aspects of the invention a pulsed sound wave that is accompanied by strong pressure variations from a sound source propagates as a spherical surface wave and can destroy the bubbles, thereby ensuring defoaming. Therefore, by contrast with the conventional process in which defoaming is performed by light irradiation, for example, with a laser beam, it is not necessary to irradiate each bubble with a beam. Therefore, defoaming can be performed rapidly and within a short time. Further, because the pulsed sound wave propagated to the inner peripheral surface of the container, even foam located in the vicinity of the inner peripheral surface of the container that has been difficult to destroy by the conventional methods can be effectively destroyed.

In addition to the above-described effect, the pulsed sound wave is generated by irradiation with pulsed light. Therefore, the pulsed sound wave can be generated reliably at a high speed with a simple device.

According to another aspect of the invention the beam power density per unit surface area can be increased by irradiating with a condensed pulsed light and the pulsed sound wave can be generated with better energy efficiency.

According to another aspect of the invention breakdown is induced and defoaming is performed by condensing the pulsed light on the gas portion above the liquid surface. Therefore, the impact on the liquid surface is decreased by comparison with the case in which the liquid surface is directly irradiated with a laser beam and liquid droplets are prevented from scattering and adhering to the device or to the glass members of the laser irradiation aperture. Therefore, this aspect of the invention is especially useful for maintaining a sanitary level of the device and optical characteristics.

According to another aspect of the invention by irradiating the liquid surface with pulsed light, it is possible to break rapidly the bubbles in the vicinity of the illumination point and also rapidly break the bubbles located at a distance from the optical path by the pulsed sound wave generated at the time of irradiation, thereby enabling efficient high-speed defoaming.

According to another aspect of the invention the liquid surface can be reliably irradiated with pulsed light even in the case of a narrow-mouth container and a pulsed sound wave can be generated inside the headspace of the narrow-mouth container. Therefore, defoaming inside narrow-mouth containers that has conventionally been difficult can be also performed reliably.

According to another aspect of the invention the liquid surface can be irradiated with the pulsed light even without disposing the light source directly above the container mouth opening.

According to another aspect of the invention the pulsed laser beam obtained with a pulsed laser can be obtained in the form of a pulsed beam having a high peak power at a low input energy. Therefore, a pulsed sound wave can be generated with better energy efficiency. Further, because the pulsed laser light has a short repetition period and pulse width, even if the container is transported, it can be handled as a substantially standing object, and a pulsed sound wave can be generated by reliably irradiating light onto the contents inside the container moving at a high speed.

According to another aspect of the invention defoaming inside a container can be performed rapidly and reliably in a line for filling a container with contents and sealing. Therefore, reliable defoaming can be performed even in a high-speed line and with narrow-mouth containers and high-quality packaged beverages can be obtained.

EXPLANATION OF REFERENCE NUMERALS 1 light source
5, 25 container
6 liquid surface
7 illumination point
8 pulsed sound wave
9 bubble
10 condensing optical system
13 light beam
15 mirror
20 bottle can
21 mouth

BEST MODE FOR CARRYING OUT THE INVENTION

Figure 1:
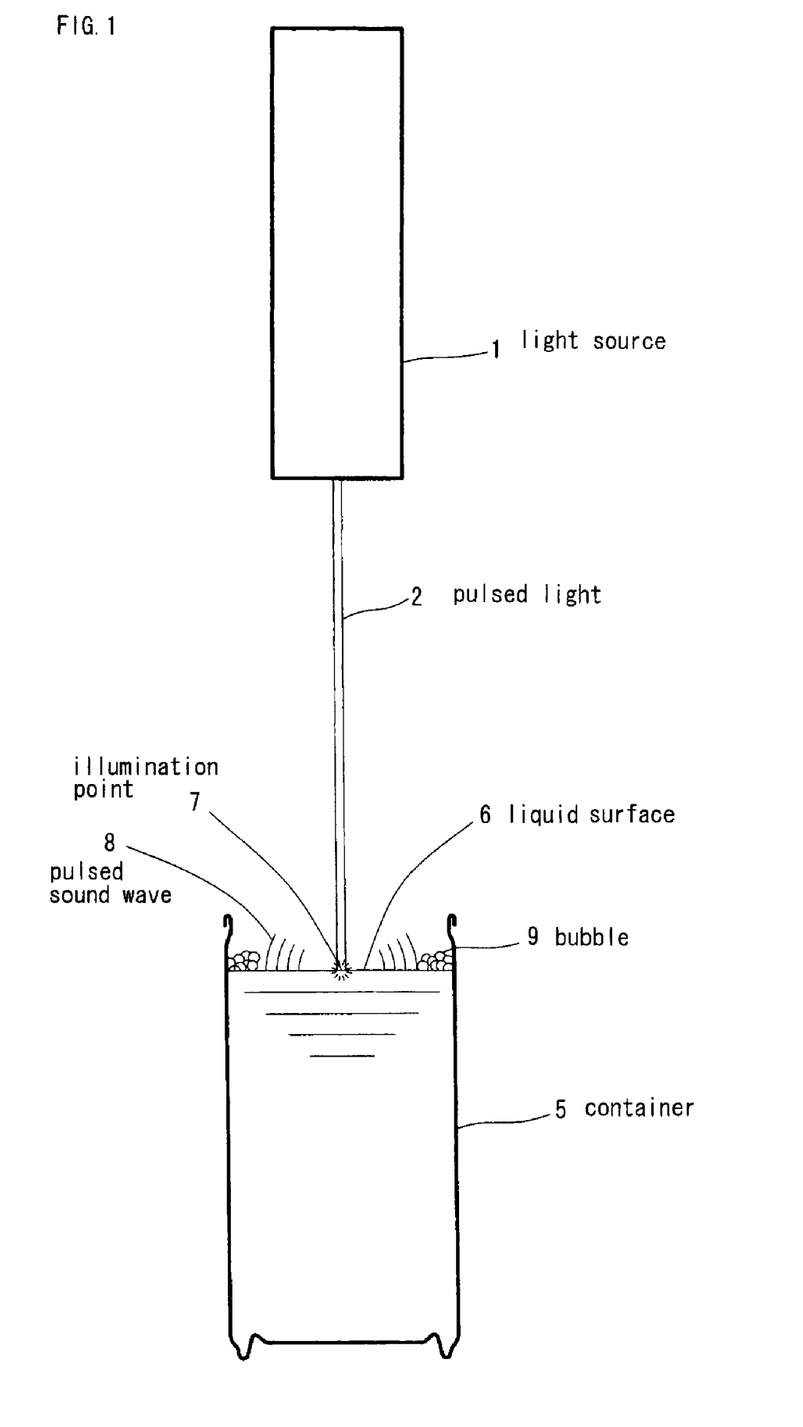
FIG. 1 illustrates schematically the defoaming principle of the defoaming method of an embodiment of the present invention.

With the defoaming method of the present embodiment, a liquid surface inside a container is irradiated with pulsed light as means for generating a pulsed sound wave, and a pulsed sound wave is generated with the irradiation point as a sound source. FIG. 1 illustrates schematically the defoaming principle of this basic configuration.

In FIG. 1, the reference numeral 1 stands for a light source that generates pulsed light. This light source is installed in a line for filling containers with contents and sealing the containers, above a conveyor that transports a container 5 filled with the contents to the sealing device or above a container passage position before sealing in the sealing device, so as to irradiate the liquid surface in the passing container with the pulsed light.

As shown in FIG. 1, where a solid or liquid target (in the case shown in the figure, liquid surface 6) is irradiated with high-intensity pulsed light generated from the light source 1, a shock pressure pulse is generated from the irradiation point of the liquid surface 6 at the irradiation instant and a pulsed sound wave can be generated. The generated pulsed sound wave propagates as a spherical surface wave 8 for which the irradiation point 7 serves as a sound source, reaches the bubbles 9 on the liquid surface, and rapidly and successively breaks them. This principle is based on the following possibility. Because the intensity of interaction between light and gas is lower than that between light and liquid or solid, the light does not react before irradiating the target and the pulsed sound wave can be generated first when the target is irradiated.

A pulsed laser capable of instantaneously emitting energy that has been accumulated in the laser medium as a light pulse is preferred as a light source for providing the pulsed light. Examples of pulsed lasers include Q-switching YAG laser, $YVO_4$ laser, YLF laser, and a femtosecond laser such as a titanium sapphire laser. These pulsed lasers have a repetition period of from several Hz to several tens of kHz, and the energy that has been accumulated within the repetition period is released within a very short interval of from several femtoseconds (fs) to several tens of nanoseconds (ns). As a result, a high peak power can be efficiently obtained from a low input energy. Various other laser light sources such as a $CO_2$ laser, an excimer laser, and a semiconductor laser can be also used as the light source. Further, higher harmonic light generated by a wavelength conversion element from the basic wave of these laser light sources can be also used. These light sources also include continuous wave (CW) light sources, and in this case, the pulsed light can be also generated by using a light control member such as a shutter.

Figure 2:
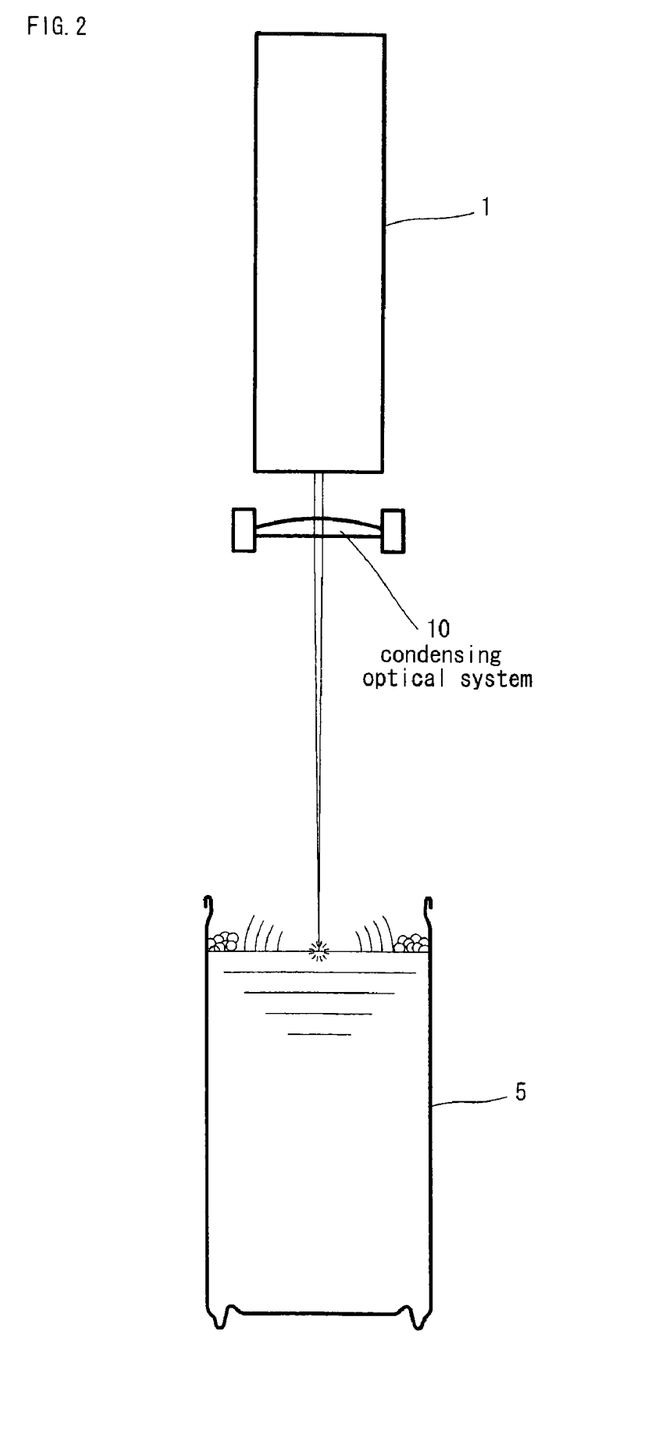
FIG. 2 illustrates schematically the defoaming principle of the defoaming method of another embodiment.

The size of the generated sound wave is determined by the beam power density per unit surface area and physical properties of the target. Therefore, as illustrated by the embodiment shown in FIG. 2, where a target is irradiated by converging the light in an irradiation point by using a condensing optical element 10 such as a lens, a pulsed sound wave can be efficiently generated. Further, when a condensing optical system is used, the beam power per unit surface area can be sufficiently decreased outside the beam waist where the light is most converged. As a result, even when the light falls on portions other than the irradiation target, for example, on the container wall surface, ceiling surface, and peripheral equipment, no damage is caused and danger to people can be avoided. When the intensity of shock pressure pulse is high, the sound wave propagates as a shock wave. In this case, an even higher bubble breakdown effect is obtained. The pulsed sound wave generated in this manner propagates as a spherical surface wave using the irradiation point as a sound source. Therefore, a bubble breakdown action can be produced even on the bubbles present in the zones far from the light propagation path and a high defoaming effect can be obtained.

Figure 3:
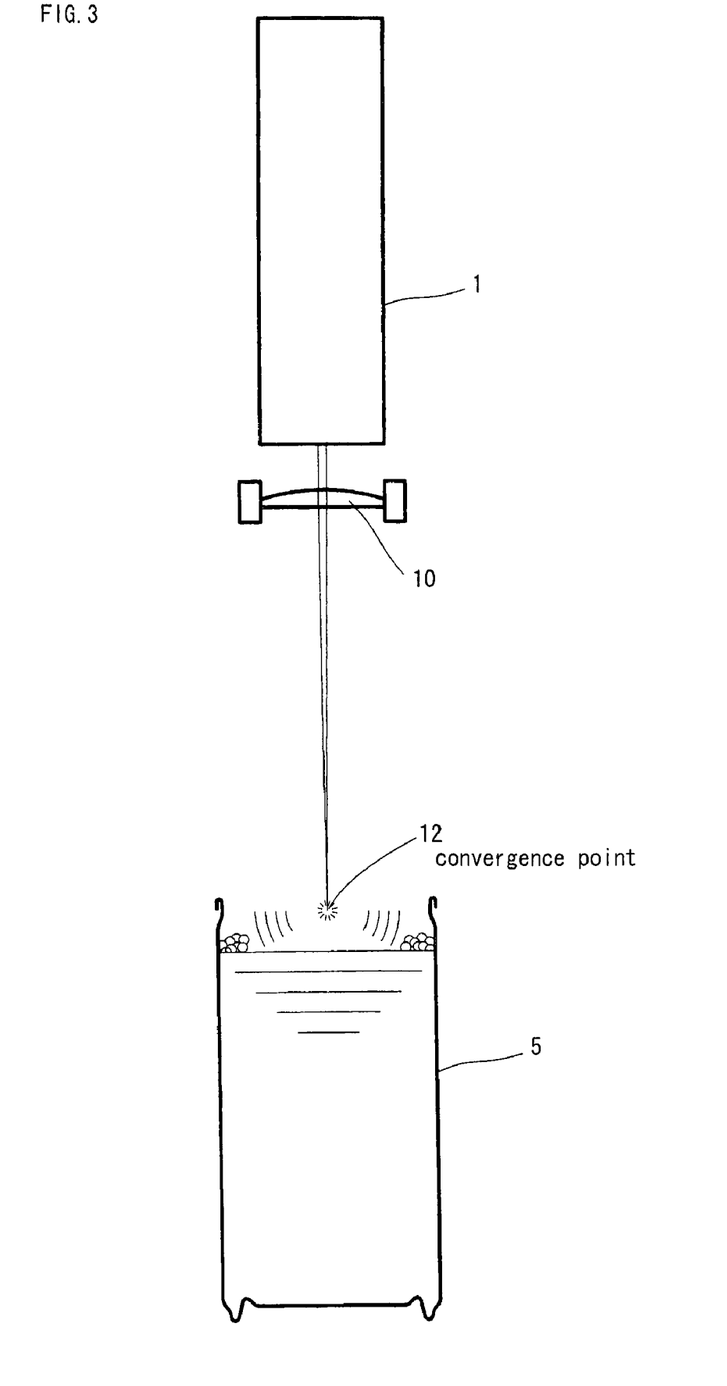
FIG. 3 illustrates schematically the defoaming principle of the defoaming method of yet another embodiment.

Further, when the high-energy light is converged, as shown in FIG. 3, the breakdown phenomenon of air in the light propagation path can be induced in the convergence point 12 even when the light is converged above the target surface and not only when the liquid or solid target is irradiated. Such configuration also makes it possible to generate a pulsed sound wave. The breakdown caused by such laser beam convergence is called Laser Induced Breakdown (LIB).

Gases typically have a density lower than that of liquids and solids, and interaction of gases with photons produced by laser is weak. As a result, in order to induce the LIB in the gas above the liquid surface, a power density of the laser beam is required to be higher than that used for directly irradiating the liquid surface. However, when a liquid surface is irradiated with a laser beam, the liquid droplets are scattered by the impact, the scattered liquid droplets adhere to the inner wall of the device and glass components of the laser emission aperture, the level of device sanitary is decreased, optical properties of the laser beam path are changed, and there is a risk of losing the converging ability. By contrast, when the LIB is induced in the gas above the liquid surface, such liquid drop scattering does not occur and the device sanitary level and optical properties can be maintained advantageously.

A stable optical system is suitable as a resonance structure of a laser. A Gaussian optical system and a stable optical system are mainly used. In the Gaussian optical system, only a single mode is generated. Therefore, the wave fronts are arranged and converging ability is high. The resultant advantage is that the LIB can be induced with high efficiency. However, a Gaussian optical system has impressive thermal stability and the repetition period thereof is fixed. As a result, it is difficult to perform laser irradiation matching different line speeds or arrival timing of the target container. By contrast, the light generated in a stable optical system is a multi-mode light in which multiple modes are mixed, the wave fronts are not arranged, and converging ability is relatively poor. As a result, a LIB generation efficiency is relatively low and a higher power is necessary. However, the advantage of stable optical systems is that the irradiation distance can be freely controlled within a range reaching the minimum repetition period, and such systems are highly suitable for filling lines.

The intensity of pulsed sound wave generated by the LIB changes depending on beam power density per unit surface area in the convergence point. By optimizing the optical system and increasing the converging ability, it is possible to induce LIB with good efficiency from the same laser output. A larger numerical aperture (NA) of a laser is generally preferred to increase the convergence ability. It means that lenses of a large diameter and short focal distance improve the converging ability. However, large-diameter lenses are expensive and can be easily contaminated and damaged. If the focal distance is short, the distance to the liquid surface is decreased and the lens can be easily contaminated by scattered liquid droplets. Further, in a line for filling containers with contents and sealing the containers, limitations are also imposed by the size of the container opening and the headspace depth. These issues have to be taken into account when designing an optical system. Further, arranging the wave fronts is preferred for improving the converging ability. Therefore, it is preferred that a combined lens (aplanat lens) in which aberrations are corrected by combining a plurality of lenses or a non-spherical lens designed by matching the lens surface to the leaf surface shape be used.

Figure 7:
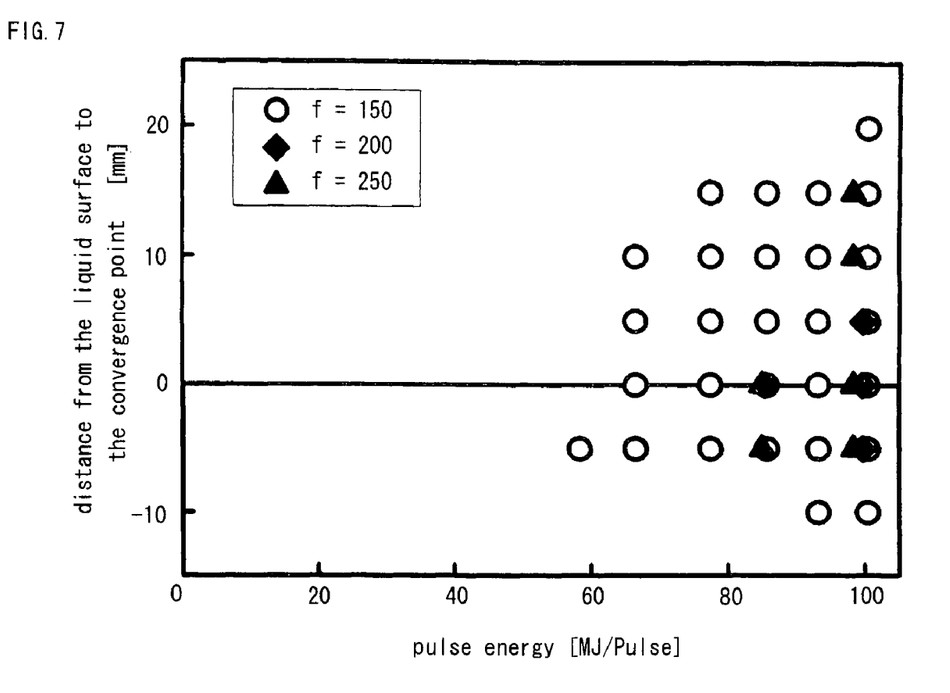
FIG. 7 is a graph illustrating the relationship between pulse energy and the position of condensing point when one-shot defoaming is performed with a plurality of lenses of different focal distances.

The inventors investigated the relationship between the focal distance of a lens and the defoaming effect by using lenses with different focal distances. Thus, under the same conditions as in Example 1 described below, an optical system was assembled in which a parallel beam of a YAG base wave generated by a Gaussian optical system was converged by using single lenses with a focal distance f of 300 mm, 250 mm, 200 mm, and 150 mm, and one-shot irradiation in a pulsed state with a pulse width of 5 ns was performed to investigate the defoaming conditions of a coffee beverage at normal temperature. The result is shown in FIG. 7. In the graph shown in FIG. 7, a laser pulse energy (mJ/Pulse) is plotted against the abscissa, and the distance from the liquid surface to the convergence point is plotted against the ordinate. As shown in FIG. 7, when a convex lens with f=150 mm is used, one-shot breakdown by light convergence in the gas portion 10 mm above the liquid surface could be realized at a pulse energy of 65 mJ/Pulse, but when convex lenses with f=200 mm and f=250 mm were used, one-shot defoaming could not be performed at a pulse energy below 100 mJ/Pulse. Further, in the case of a lens with f=300 mm, one-shot defoaming could not be performed even at 100 mJ/Pulse. Accordingly, this result is not shown in the figure.

It follows from the above that the shorter is the focal distance of the lens, the higher is the defoaming efficiency, and in this test, the highest defoaming efficiency was attained at f=100 mm. For example, at 65 mJ/Pulse, one-shot defoaming could be performed when the convergence point was at the liquid surface, 5 mm below the liquid surface, and 10 mm above the liquid surface. By contrast, when the lenses with f=200 mm and f=250 mm were used, one-shot defoaming could be performed with the convergence point on the liquid surface, below the liquid surface, and above the liquid surface only at 100 mJ/Pulse.

Therefore, when the defoaming is performed using a shock wave generation by LIB, it is preferred that the optical system be set such that the distance f from the converging lens to the focal point satisfy the condition $100 \text{ mm} \leq f \leq 250 \text{ mm}$.

Figure 4:
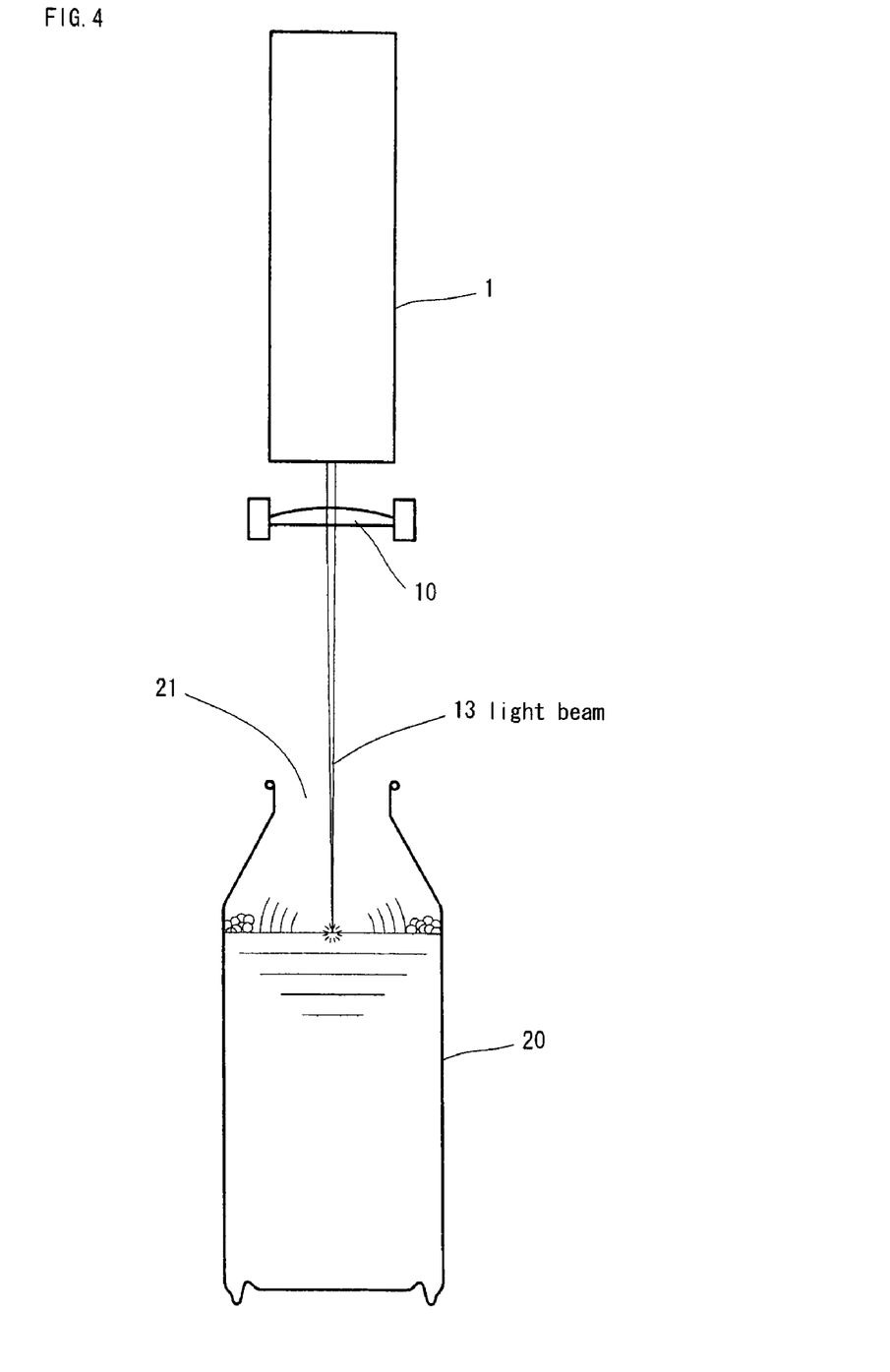
FIG. 4 illustrates schematically the defoaming principle of the defoaming method of an embodiment of the present invention in the case of application to narrow-mouth containers.

FIG. 4 illustrates an embodiment in which the present invention is applied to a narrow-mouth container having a mouth portion that is narrower than the liquid surface where foam is generated, such as a PET bottle or a bottle can 20. A light beam such as a laser beam can be emitted from a light source that is sufficiently smaller than the mouth portion of the narrow-mouth container. Further, as shown in the figure, an even narrower light beam 13 can be formed when a condensing optical system having a condensing optical element 10 is used. Such a narrow light beam can pass through the mouth portion 21 of the narrow-mouth container and reach the headspace portion, thereby making it possible to generate a pulsed sound wave by any of the above-described methods. The generated pulsed sound wave can propagate as a spherical surface wave from the sound source, reach any location in the headspace portion, and break down the bubbles.

The repetition period and pulse width of a pulsed laser beam are typically small. Therefore, even if the container is transported, it can be handled as a substantially standing object. A pulsed sound wave may be generated ones or a plurality of times with any repetition period with respect to a single container. A single light beam may be irradiated or a plurality of light beams may be irradiated. Further, a plurality of pulsed sound waves may be generated by scanning the light beam by using an optical element such as a galvanic mirror.

Figure 5:
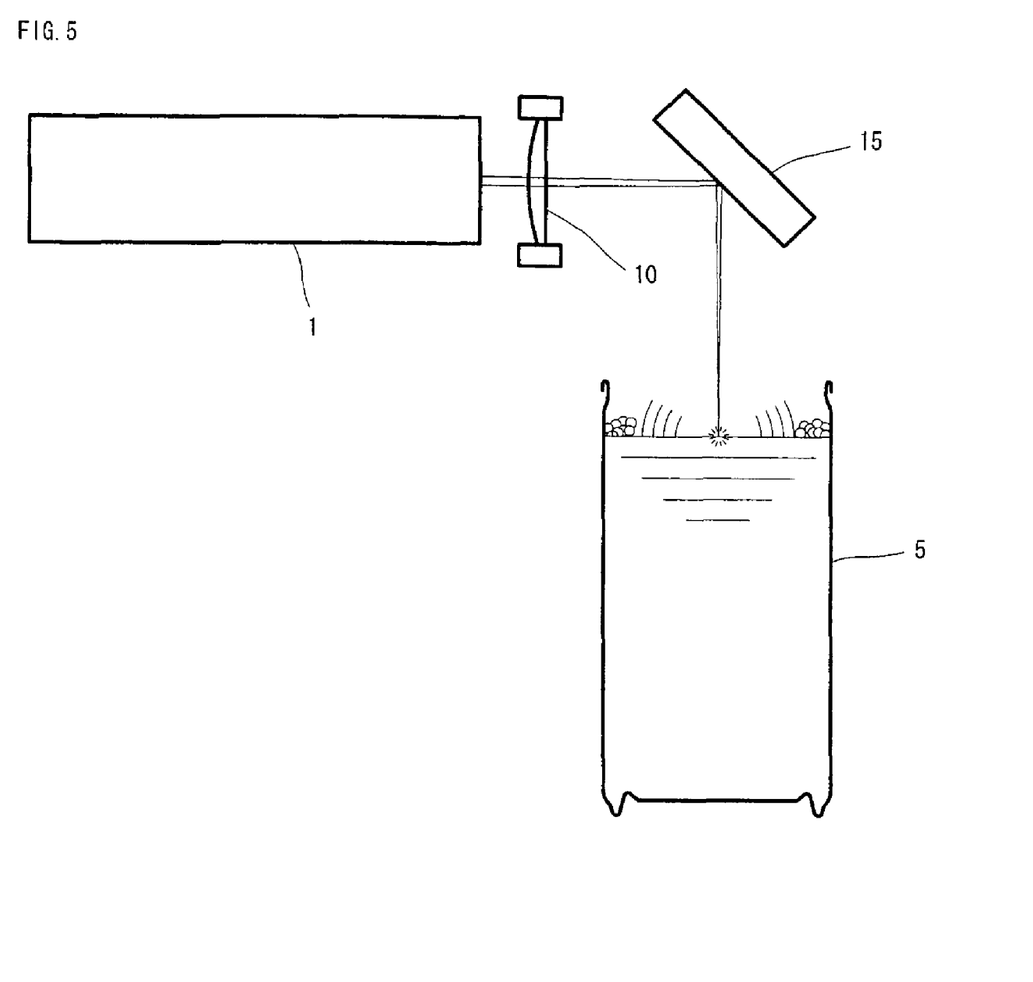
FIG. 5 illustrates schematically the defoaming principle of the defoaming method of yet another embodiment.

As for the arrangement of optical system, the light source and converging optical element can be disposed directly above the container, as in the embodiment illustrated by FIG. 1 to FIG. 4. However, in some cases, there is a risk of causing unexpected contamination or introducing impurities due to the presence of these components. In order to avoid it, an optical arrangement can be employed in which a mirror or a member such as an optical fiber is used so that the light source and condensing optical element are not disposed directly above the container. FIG. 5 illustrates one such embodiment. Here, a light source 1 is arranged at a right angle to the conveying path above and outside the container conveying path, and the light is converged by a converging optical element 10 and reflected at a right angle by a mirror 15 to fall on the liquid surface inside the container.

Figure 6:
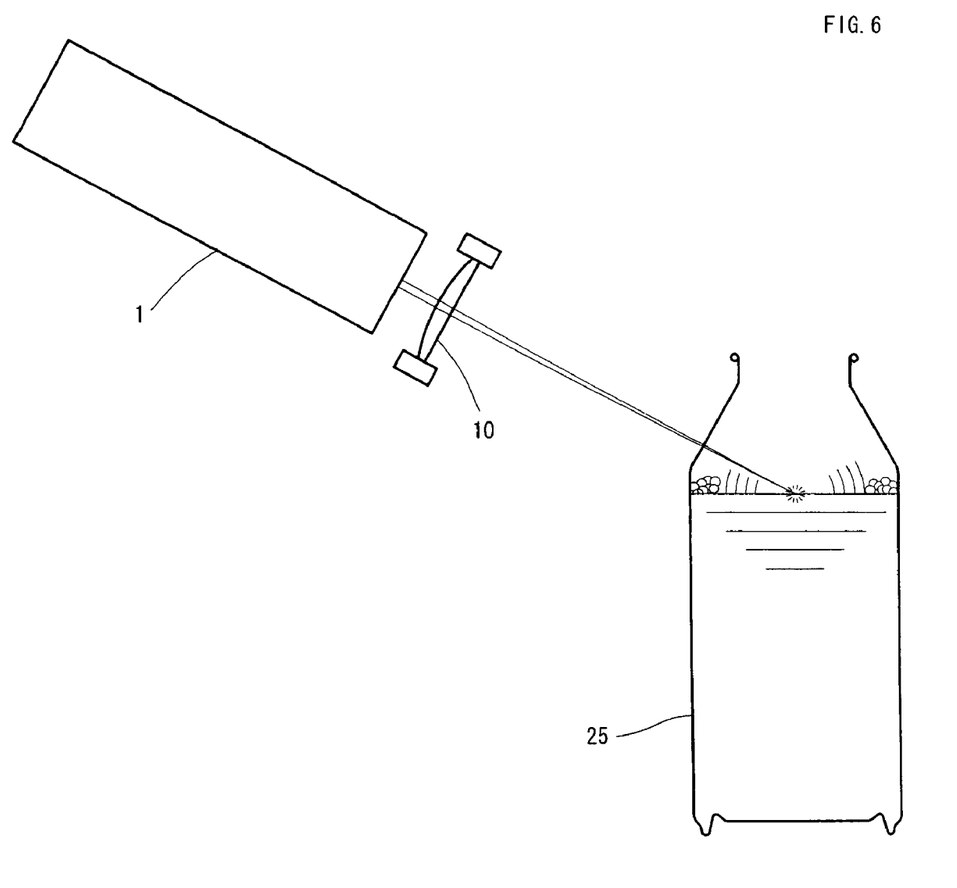
FIG. 6 illustrates schematically the defoaming principle of the defoaming method of yet another embodiment.

With a container having a transparent wall surface, such as a glass or plastic, the pulsed sound wave can be generated by causing the light to pass through the container wall surface into the container. FIG. 6 illustrates an embodiment relating to such a configuration. The advantage of such a configuration is that the optical system such as a light source 1 is not required to be disposed directly above the mouth portion of a container 25 having a transparent wall surface. In this case, by providing for an adequate convergence gain, it is possible to employ a sufficiently low beam power density to avoid damaging the container wall surface by the light passing therethrough, form a high beam power density inside the container, and generate a sound wave having a large sound pressure.

Various embodiments of the defoaming method in accordance with the present invention are described above, but the present invention is not limited to these embodiments, and specific means thereof are not particularly limited, provided that bubbles can be instantaneously destroyed by using a pulsed sound wave, and a variety of methods can be employed therefor.

EXAMPLE 1

The basic wave of a Q-switched YAG laser was converged with a convex lens with a focal distance of 300 mm, and the liquid surface of coffee filled in a can (opening diameter 50 mm) with a capacity of 200 g was irradiated. The liquid surface was covered with foam having a height of 10 mm over the entire mouth portion. The laser beam had a wavelength of 1064 nm, a pulse width of 5 ns, a repetition period of 10 Hz, and an average beam power of 1 W. The beam diameter in the focus position was 200 μm, and the beam power density per unit surface area was 5 GW/cm². When the liquid surface was irradiated with 10 shots of such light beam, the foam was completely destroyed and the entire liquid surface was exposed.

EXAMPLE 2

The liquid surface of coffee filled in a PET bottle (mouth diameter 20 mm, body diameter 80 mm) with a capacity of 500 mL was irradiated in the same manner as in Example 1. The liquid surface was covered with foam having a height of 15 mm over the entire head space. When the liquid surface was irradiated with 10 shots of such light beam, the foam was completely destroyed and the entire liquid surface was exposed.

Examples 1, 2 confirmed that the method in accordance with the present invention enables instantaneous defoaming even of coffee beverages on which the bubbles are comparatively difficult to break down and also when the entire liquid surface in the container is covered with foam. Further, foam located on the wall surface circumference of a container is not easy to destroy by the conventional methods, but this foam is also reliably destroyed in the examples. Moreover, as shown in Example 2, defoaming in a narrow-mouth container can be performed as effectively as in a wide-mouth container, and while the foam in the narrow-mouth containers such as PET bottles cannot be rapidly and reliably destroyed by the conventional methods, it can be destroyed with the present invention. Therefore, by applying the present invention, for example, to a production line of tea beverages in PET bottles in which foaming and oxidation easily occur, it is possible to obtain high-quality tea beverages with a better level of deoxidation. Further, when foam is present over the entire liquid surface, as in the above-described examples, the bubbles present on the optical path of the laser beam are directly destroyed by light energy, whereas other bubbles are destroyed by a pulsed sound wave generated at the liquid surface.

EXAMPLE 3

The basic wave (beam diameter 9 mm) of a Q-switched pulsed YAG laser was converged with an aplanat convex lens with a focal distance of 150 mm, the beam was converged 10 mm above the liquid surface of green tea beverage filled in a can (opening diameter about 50 mm) with a capacity of 200 g, and laser induced breakdown (LIB) was generated. Foam with a thickness of about 5 mm remained along the edge with the side wall on the liquid surface of the green tea beverage.

The laser beam was in a Gaussian mode and had a laser wavelength of 1064 nm, a pulse width of 5 ns, a repetition period of 10 Hz, and an average beam power of 1 W. Thus, the light energy per one pulse was 100 mJ. With one-shot irradiation of the pulse, the entire foam present on the liquid surface was destroyed by the sound wave generated by LIB.

Further, when the laser beam was converged on the liquid surface under the same conditions, the foam could be completely destroyed at 50 mJ.

EXAMPLE 4

An optical system was assembled in which the basic wave (beam diameter 3 mm) of a Q-switch pulsed YAG laser was expanded to a beam diameter of 24 mm with a beam expander configured by a concave lens and a convex lens, then fell on an aplanat convex lens with a focal distance of 150 mm and a lens diameter of 30 mm, and was converged in a position at a distance of 150 mm from the aplanat convex lens. The laser had a stable resonator structure, the laser beam was a multi-mode beam, the laser wavelength was 1064 nm, the pulse width was 5 ns, and the repetition period could be varied within a range with a maximum of 20 Hz. The emission could be obtained at any timing with a trigger signal. LIB was generated by laser beam irradiation at a repetition period of 20 Hz and a light energy of 150 mJ per one pulse by using this device. The convergence point was disposed 10 mm above the liquid surface of a green tea beverage filled in a can (opening diameter 5 mm) with a capacity of 200 g, and foam with a thickness of about 5 mm remaining along the edge with the side wall was completely destroyed by a sound wave generated by LIB in one-shot irradiation with the laser pulse.

INDUSTRIAL APPLICABILITY

The defoaming method in accordance with the present invention is suitable for destroying foam generated when a container such as a can, a PET bottle, a bottle can, a glass bottle, and a pouch is filled with a liquid such as a beverage, but this method is not limited to the case of packaging in containers and can be also used for destroying foam generated in various food production processes such as a tofu production process or as a defoaming method in a variety of industrial fields.

The invention claimed is:

1. A defoaming method, characterized in that bubbles are destroyed and defoamed by using a pulsed sound wave; wherein the pulsed sound wave is generated by irradiation of pulsed light, wherein the pulsed sound wave is generated by condensing the pulsed light in a gas portion above a liquid surface.

2. The defoaming method according to claim 1, characterized in that with respect to a container having a mouth that is narrower than a liquid surface where foam is generated, a diameter of a light beam of the pulsed light is made less than a diameter of the mouth, and pass the light beam through the mouth.

3. The defoaming method according to claim 1, characterized in that the pulsed light is irradiated through a wall surface of the container.

4. The defoaming method according to claim 1, characterized in that the pulsed light is a pulsed laser beam.

5. A defoaming method, characterized in that in a line for filling a container with contents and sealing the container, foam generated inside a headspace of the container that is filled with the contents and is transferred to a sealing machine is destroyed by the defoaming method according to claim 1.

* * * * *